United States Patent [19]

Greene

[11] Patent Number: 5,116,937
[45] Date of Patent: May 26, 1992

[54] WATER-SWELLABLE THERMOPLASTIC COPOLYETHERESTER ELASTOMER

[75] Inventor: Robin N. Greene, Rockland, Del.

[73] Assignee: E. I. Du Pont de Nemours and Company, Wilmington, Del.

[21] Appl. No.: 709,920

[22] Filed: May 31, 1991

[51] Int. Cl.⁵ .............................................. C08G 63/20
[52] U.S. Cl. ................................... 528/272; 528/298; 528/300; 528/301; 528/302; 528/308; 528/308.6
[58] Field of Search ............... 528/272, 298, 300, 301, 528/302, 308, 308.6

[56] References Cited

U.S. PATENT DOCUMENTS

| | | | |
|---|---|---|---|
| 3,023,192 | 2/1962 | Shivers | 528/300 |
| 3,932,326 | 1/1976 | Hoh et al. | 524/272 |
| 3,941,904 | 3/1976 | Hoh et al. | 427/207 |
| 3,954,689 | 5/1976 | Hoeschele | 528/295.3 |
| 4,117,033 | 9/1978 | Gale | 524/539 |
| 4,124,653 | 11/1978 | Whitlock | 525/173 |
| 4,156,702 | 5/1979 | Edinger | 528/229 |
| 4,247,427 | 1/1981 | Edinger | 523/506 |
| 4,295,652 | 10/1981 | Saito et al. | 273/235 |
| 4,321,341 | 3/1982 | Neuberg et al. | 525/437 |
| 4,731,407 | 3/1988 | Benim et al. | 524/451 |

Primary Examiner—John Kight, III
Assistant Examiner—Sam A. Acquah

[57] ABSTRACT

A segmented copolyetherester elastomer has soft segments formed from 60-95% poly(ethylene oxide) glycol and 40-45% of a second poly(alkylene oxide)glycol, preferably poly(tetramethylene oxide) glycol, and hard segments formed from terephthalic acid and ethylene glycol or 1,4-butane diol, the hard segments amounting to 8-20% of the elastomer weight. The elastomer can be molded into soft, elastic objects and can absorb water amounting to at least 100% of its dry weight.

14 Claims, 1 Drawing Sheet

FIGURE
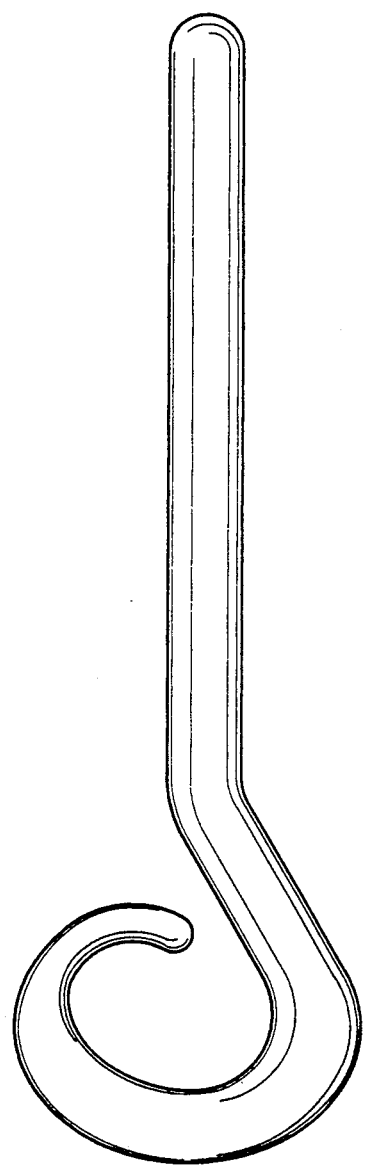

WATER-SWELLABLE THERMOPLASTIC COPOLYETHERESTER ELASTOMER

BACKGROUND OF THE INVENTION

1. Field of the Invention

This invention relates to a thermoplastic, hydrophilic, segmented, copolyesterether elastomer. More particularly, the invention concerns such an elastomer having certain soft segments that are long chain ester units formed from poly(alkylene oxide) glycols and certain hard segments that are short chain ester units formed from diols and dicarboxylic acids, esters or ester-forming derivatives. The elastomers, when swollen with imbibed water, are particularly suited for use in artificial fishing lures, wet wound-dressings, and the like. 2. Description of the Prior Art Shivers, U.S. Pat. No. 3,023,192, discloses hydrophilic, thermoplastic, segmented copolyetherester elastomers having soft and hard segments. The soft segments constitute about 35 to about 75% of the elastomer weight and are derived from a poly(alkylene oxide) glycol, such as poly(ethylene oxide) glycol, poly(propylene oxide) glycol, poly(tetramethylene oxide) glycol and mixtures thereof, preferably a poly(tetramethylene oxide) glycol. The hard segments constitute 65 to 25% of the elastomer and are derived from an aromatic dicarboxylic acid, such as terephthalic, isophthalic, bibenzoic, naphthalene dicarboxylic, and mixtures thereof, preferably terephthalic acid. Shivers discloses at column 10, lines 45-68, that many of his elastomers are hydrophilic. However, the polyetherester elastomers disclosed by Shivers, are inadequate for certain specialty applications, such as those that require the elastomer to imbibe large quantities of water and still have adequate elasticity and strength. An object of this invention is to provide a copolyetherester elastomer that overcomes or at least significantly reduces the aforementioned inadequacies.

SUMMARY OF THE INVENTION

The present invention provides a thermoplastic, segmented copolyetherester elastomer which consists essentially of a multiplicity of recurring intralinear long-chain and short-chain ester units connected head-to-tail through ester linkages, wherein the long-chain ester units amount to 80 to 92 weight percent of the elastomer and are represented by the structure

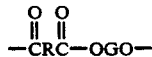
(I)

and the short-chain ester units amount to 20 to 8 weight percent and are represented by the structure

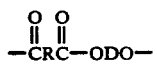
(II)

and wherein

R is a divalent radical which remains after removal of two carboxyl groups from a dicarboxylic acid selected from the group consisting of terephthalic acid, 4,4'-bibenzoic acid, 2,6-naphthalenedicarboxylic acid and mixtures thereof, G is a divalent radical which remains after removal of two hydroxyl groups from a long chain poly(alkylene oxide) glycol having a number average molecular weight in the range of 1,000 to 3,500 and consisting essentially of 60 to 95 weight percent of poly(ethylene oxide) glycol copolymerized or mixed with 40 to 5 percent of a second poly(alkylene oxide) glycol, and D is a divalent radical which remains after removal of terminal hydroxyl groups from a short chain diol selected from the group consisting of ethylene glycol, 1,3-propane glycol, 1,4-butane diol and mixtures thereof. A preferred second poly(alkylene oxide) glycol is poly(tetramethylene oxide) glycol.

The present invention also provides fibers, films, and molded articles of the above-described elastomer, including a molded article in the form of a water-swellable, worm-shaped, artificial fishing lure, and processes for its manufacture and treatment. Such articles of the invention absorb water in amounts equal to at least the dry weight of the elastomer and exhibit satisfactory strength and elastic properties.

BRIEF DESCRIPTION OF THE DRAWING

The attached drawing is a side-view of an article molded from elastomer of the invention. The article is generally circular in cross-section and is intended, when swollen with imbibed water, for use as an artificial worm-like fishing lure.

DETAILED DESCRIPTION OF PREFERRED EMBODIMENTS

The elastomer of the invention consists essentially of long chain ester units, which constitute the "soft segments" of the elastomer, and short chain ester units, which constitute the "hard segments" of the elastomer.

In accordance with the present invention, the long chain ester units, or soft segments, of the elastomer constitute 80 to 92 percent of the total elastomer weight, preferably 85 to 90%. These segments are formed by reacting terephthalic acid, 4,4'-bibenzoic acid, 2,6-naphthalene dicarboxylic acid or mixtures thereof with an oligomeric poly(alkylene oxide) glycol to form a long chain polymeric glycol ester. The poly(alkylene oxide) glycol consists essentially of 60 to 95 weight percent poly(ethylene oxide) glycol mixed or copolymerized with 40 to 5 weight percent of a second poly(alkylene oxide) glycol, preferably poly(tetramethylene oxide) glycol. Preferably, the poly(alkylene oxide) glycol is at least 70% poly(ethylene oxide) glycol. The long chain oligomeric glycol has terminal (or as nearly terminal as possible) hydroxyl groups and a molecular weight that is usually in the range of about 1,000 to 3,500, preferably 1,400 to 2,000. Within these ranges, broad or narrow molecular weight distributions are suitable for use in the invention. When incorporated into the elastomer, the long chain oligomeric glycol forms long chain ester repeating units (soft segments) of the elastomer structure shown in Formula I above.

The desired mole percent of ethylene oxide comonomer can be obtained by blending oligomeric glycols or by using ethylene oxide/alkylene oxide copolymer oligomeric glycols. For example, a blend can be made of a glycol having a high content of the comonomer with a glycol having a lower comonomer content or no comonmer at all. The desired molecular weight of the glycol can be similarly obtained by blending.

The short chain ester units, or hard segments, are formed by reacting terephthalic acid, or 4,4'-bibenzoic acid or 2,6-naphthalenedicarboxylic acid or mixtures thereof with ethylene glycol, 1,3-propane diol, or 1,4-butane diol, to form a polyester. When incorporated into the elastomer, the polyester forms the short chain ester repeating units (hard segments) of the structure shown in Formula II above. Usually, the hard segments of the elastomers constitute 8 to 20 percent of the total elastomer weight, preferably 10 to 15%. Hard segments of preferred elastomers of the invention are formed from (a) ethylene glycol and terephthalic acid or (b) 1,4-butane diol and terephthalic acid.

The mole ratio of hard segment to soft segment in elastomers of the invention depends on the composition of the hard segment, as noted in the following list:

| | HS/SS Range | |
|---|---|---|
| HS | Usual | Preferred |
| 2G/T | 1-3 | 1.3-2.2 |
| 4G/T | 0.3-1.3 | 0.8-1.2 |
| 4G/N | 0.3-1.3 | 0.8-1.2 |
| 3G/BB | 0.3-1.3 | 0.3-0.7 |

When the HS/SS ratio of the elastomer is below the stated minimum value of the range, the elastomer usually possesses undesirably low tensile and tear strengths. As the HS/SS ratio is increased within the preferred range, the strengths usually improve. When HS/SS ratio is greater than the stated maximum value of the range, water-soaked molded objects of the elastomer become stiff and hard due to insufficient imbibing of water.

Note that small amounts of other diols or diacids can be included in the hard segments, usually amounting to no more than 15 weight percent of structural formula II above. Such small amounts have little detrimental effect on the desirable properties of water-swollen elastomers of the invention.

The preceding discussion refers to terephthalic acid, 4,4'-bibenzoic acid, 2,6-naphthalenedicarboxylic acid, for reaction with oligomeric glycols or diols, to form the required soft and hard segments of the elastomer of the invention. As used herein, these dicarboxylic acids are intended to include equivalents, which have two functional carboxyl groups and perform substantially like dicarboxylic acids in reaction with glycols and diols to form copolyetherester polymers. Such equivalents include esters and ester-forming derivatives (e.g., acid halides and anhydrides).

The elastomers of the invention can be produced by first preparing a prepolymer by conventional ester interchange and then increasing the molecular weight of the prepolymer by conventional polycondensation. For example, the prepolymer can be prepared by heating the dimethyl ester of terephthalic acid or of 2,6-naphthalene dicarboxylic acid with a long chain glycol and an excess of diol in the presence of a catalyst at 150°-260° C., while distilling off methanol formed by the ester interchange. Depending on temperature, catalyst, glycol excess, and equipment, the reaction can be completed within a few minutes to a few hours. This procedure results in a prepolymer which can be increased in molecular weight by the procedure described below.

The desired prepolymers can also be prepared by other known alternative esterification or ester interchange processes. For example, the long chain glycol can be reacted with a low molecular weight, short chain ester homopolymer or copolymer, in the presence of catalyst, until randomization occurs. The short chain ester homopolymer or copolymer can be prepared by ester interchange from the dimethyl esters and low molecular weight diols, as above, or from the free acids with diol acetates. Alternatively, the short chain ester copolymer can be prepared by direct esterification from suitable acids, anhydrides, or acid chlorides, for example, with diols, or by reaction of the acids with cyclic ethers or carbonates. The prepolymer could also be prepared by performing the reactions in the presence of a long chain glycol.

The prepolymers described in the preceding two paragraphs can be carried to high molecular weight by known polycondensation processes, in which excess short chain diol is distilled off. Further ester interchange occurs during such polycondensation or distillation and serves to increase molecular weight and randomize the arrangement of the copolyester units. Best results are usually obtained when the final distillation or polycondensation is conducted at a pressure of less than 5 mm Hg and at a temperature of about 220°-260° C. for less than 6 hours (e.g., 0.5 to 5 hours) in the presence of conventional antioxidants. Practical polymerization techniques usually rely upon ester interchange to complete the polymerization. To avoid excessive time at high temperatures and possible accompanying thermal degradation, a catalyst can be employed in the ester interchange. Preferred catalysts are tetrabutyl titanate and/or butylstannoic acid.

Ester interchange polymerizations are generally conducted in the melt without added solvent, but inert solvents can be added to facilitate removal of volatile components at low temperatures. This technique is especially valuable during prepolymer preparation by direct esterification. Other special polymerization techniques can be useful for preparation of specific polymers. Polycondensation of prepolymer can also be accomplished in the solid phase by heating divided solid prepolymer in a vacuum or in a stream of inert gas to remove liberated low molecular weight diol.

Batch or continuous methods can be used for the processes described above or for any stage of the elastomer preparation. Continuous polymerization, by ester interchange with a prepolymer, is a well established commercial process and usually is preferred. To increase the melt strength of elastomers of the invention, branching agents are sometimes incorporated into the elastomer, usually in a concentration of 0.01 to 0.03 equivalents per kilogram of polymer. The branching agent can be a polyol having 3-6 hydroxyl groups, a polycarboxylic acid having 3 or 4 carboxyl groups or a hydroxyacid having a total of 3-6 hydroxyl and carboxyl groups. Representative polyol branching agents include glycerol, pentaerytritol, sorbitol, trimethylol propane, 1,2,6-hexanetriol and 1,1,4,4-tetrakis(hydroxymethyl)cyclohexane. Representative acid branching agents include trimesic, hemimellitic, trimellitic, pyromellitic, 1,1,2,2-ethanetetracarboxylic, 1,1,2-ethanetricarboxylic, 1,3,5-pentanetricarboxylic, 1,2,3,4-cyclopentanetetracarboxylic acids and the like. The acids can be used as is, but usually are preferred in the form of lower alkyl esters.

Conventional additives (e.g., pigments, fillers, antioxidants, ultraviolet light stabilizers, etc.) can be incorporated in the elastomers by known techniques. The elastomers can be formed into shaped articles by melt spinning, injection molding or compression molding. For special purposes, such for use as worm-like fishing lures made from water-swollen elastomer of the invention, garlic, salt, sugar, food additives, flavorings, scents and the like also can be added to the elastomer. To imbibe these ingredients into the elastomer, the shaped elastomer is soaked in an 1-10% aqueous solution of the ingredient. Also, conventional or copolymerizable dyes and/or light-reflecting particles can be incorporated during or after polymerization.

For convenience, several abbreviations are used herein, as follows:

2G/T: hard segment formed from ethylene glycol (2G) and terephthalic acid (T)
4G/T: hard segment formed from 1,4-butane diol (4G) and terephthalic acid
4G/N: hard segment formed from 1,4-butane diol and 2,6-naphthalene dicarboxylic acid (N)
3G/BB: hard segment formed from 1,3-propane diol (3G) and 4,4'-bibenzoic acid (BB)
PO2G: poly(ethylene oxide) glycol, also called PEO
PO3G: poly(1,2-propylene oxide) glycol
PO4G: poly(tetramethylene oxide) glycol, also called PTMEG or poly(tetramethyleneether) glycol
DMBB: dimethyl bibenzoate
DMI: dimethyl isophthalate
DMN: dimethyl 2,6-naphthalene dicarboxylate
DMT: dimethyl terephthalate
TPA: oligomer of terephthalic acid (TPA) and ethylene glycol, for purposes of calculation, the formula weight is taken as 192.
AO-330: 1,3,5-trimethyl-2,4,6-tris [3,5-di-t-butyl 4-hydroxy-benzyl]benzene antioxidant sold by Ethyl Corporation
TBT: tributyl titanate transesterification catalyst
BSA: butylstannoic acid catalyst
TMTM: trimethyltrimellitate, a branching agent
SS: soft segment of elastomer
HS: hard segment of elastomer
HS/SS: mole ratio of hard to soft segment
%HS: percent hard segment (based on total weight of elastomer)
MW: number average molecular weight of the long chain glycol (corrected for content of oligomeric cyclic alkylene oxides)

Test Procedures

Various characteristics and properties mentioned in the preceding discussion and in the Examples below were determined by the following test procedures.

The concentration of hard segment in elastomer of the invention is calculated by the formula, $$\% \ HS = \text{weight percent hard segment} = \frac{100(M_{hs})[(w_1/M_1) - (w_2/M_2)]}{(M_{hs})[(w_1/M_1) - (w_2/M_2)] + (M_{ss})(w_2/M_2)}$$

wherein
w is weight,
M is molecular weight
and subscripts
hs refers to hard segment (short chain ester),
ss refers to soft segment (long chain ester),
1 refers to the dimethyl ester of starting diacid and
2 refers to the long chain glycol.

Note that the weight of the long chain glycol, as used in the formula, must have the weight of inert oligomeric cyclic ethers subtracted from the total weight of the glycol. Such oligomeric ethers usually amount to about two weight percent of poly(tetramethylene oxide) glycols made by polymerization of tetrahydrofuran. Smaller amounts of other hard segment monomers, derived from small amounts of another "hard" acid (e.g., 4G/N in a polymer in which the major hard segment combination is 4G/T) are considered to be part of the soft segment. Smaller amounts of other hard segment monomers derived from small amounts of another "hard" diol (e.g., 2G/T in a polymer in which the major hard segment combination is 4G/T) are considered to be part of the soft segment. The ratio of 2G/T to 4G/T must be determined by analyzing the resultant polymer (e.g., by nuclear magnetic resonance), rather than from the starting proportions of 2G and 4G used in the polymerization, because 2G boils off preferentially during the vacuum cycle.

Number average molecular weight of the glycol is determined by reacting the glycol with an excess of acetic anhydride in pyridine and then back-titrating with sodium hydroxide to measure the amount of acetic acid produced.

Water content of the elastomer is measured with a Du Pont Model 1090 Thermogravimetric Analyzer (TGA), by raising the temperature of a water-swollen sample from room temperature to 200° C. at 20° C./min. Such an analysis is described, for example, by B. Wunderlich, "Thermal Analysis", Rensselaer Polytechnic Institute (1981). The water content is defined as the weight loss of the sample as it reaches 200° C. In the examples, the water imbibed by an elastomer is given as a percent of the dry weight of the elastomer.

All water-swellable elastomers of this invention can contain water equal in weight to at least the weight of the dry elastomer itself. Also, the elastomers of the invention, when containing water equal to its dry weight, can recover at least 80% from a stretch of 100%.

The examples which follow are illustrative of the present invention and are not intended to limit the scope, which is defined by the claims.

EXAMPLES

The following examples describe the production of various hydrophilic elastomers in accordance with the invention. The hard segments of the elastomers of Examples 1-5 are of 2G/T; those of Examples 6-8, of 4G/T; those of Example 9, of 4G/N; and those of Example 10, of 3G/BB. Molded samples were made of the elastomer of each example. The amount of water imbibed by the samples as a result of being immersed in water at room temperature for 24 hours was measured. The adequacy of the elastomeric characteristics of the samples was established.

The same equipment and general procedures were used for preparing each elastomer of the examples. A stainless steel kettle of 0.3-liter capacity was equipped for distillation and fitted with a stainless steel stirrer that had a paddle that was shaped to conform to the internal radius of the kettle. The paddle was positioned about 0.3 cm (⅛ inch) from the bottom of the kettle. After ingredients were charged to the kettle, the stirrer was started. The kettle and its contents were then placed in a Woods metal bath and heated to 244C for 40 minutes, during which time stirring was continued and methanol was distilled from the mix. The pressure in the system was then reduced over the course of about an hour to 0.3 mm of mercury. Distillation was continued at the reduced pressure for about another hour. The resulting viscous molten product was removed from the kettle and allowed to cool. The inherent viscosity of the elastomers produced in the examples (measured in a solution of 0.5 gram of elastomer in 100 ml of m-cresol at 30° C., by the method of W. R. Sorenson and T. W. Campbell, "Preparative Methods of Polymer Chemistry", Interscience Publishers, 2nd ed., page 44, (1968)) were usually in the range of about 1.0 to 1.6 dL/g.

Compression molded samples of each elastomer were made for further testing. For each sample, about 5 grams of molten elastomer product was placed within a cavity mold that had been sprayed with "RemGrit" TFL50, a release agent, and compression molded with a hydraulic press at a temperature of 130° C. and a pressure of at 1400 psig (9,646 kPa) for one minute. After cooling to 50° C., a small worm-like molded article was removed from the mold. The article, which is illustrated in FIG. 1, measured 2 ⅝-inches (6.67-cm) long by ⅛ inch (0.32 cm) in diameter with a thinner "curly" tail of about ⅞-inch (2,2-cm) length and 0.024-inch (0.06-cm) diameter. The molded elastomer was then soaked in water for a day and its water-imbibing characteristics were then determined.

For the preparations described below, the number average molecular weights for the starting glycols were 1,540 for PO2G and 1,800 for PO4G, except for Example 4, in which the molecular weights were 3,400 and 2,000, respectively, and Example 8, in which they were 1,000 and 2,000 respectively. Note that the ingredients for each elastomer preparation included 1.5 ml of 5% by weight of tributyl titanate esterification catalyst (TBT) in n-butanol and 1.0 ml of 1% by weight of butylstannoic acid catalyst (BSA) in methanol. All other ingredients are listed Tables I, II and III.

In the tables, MW is number average molecular weight of the oligomeric starting glycols, corrected for their oligomeric cyclic ether content; % HS is the weight percent of 2G/T or 4G/T hard segment in the elastomer; HS/SS is the molar ratio of hard segment to soft segment in the elastomer; and % $H_2O$ is the amount of water imbibed by the elastomer when soaked in water for 24 hours.

Further details of each preparation and resultant elastomer are given in each example. Each elastomer of the invention was capable of imbibing water amounting to at least 100% of its dry weight and had satisfactory tensile, tear, tactile and elastomeric properties.

EXAMPLES 1-5

In these examples, five samples of elastomer of the invention were prepared by the general procedure described above. Each elastomer had 2G/T hard segments that were formed from ethylene glycol and terephthalic acid or a derivative thereof. Table I lists the weights (in grams) of ingredients used to make the elastomers.

Example 2 employed the same general procedure as the other examples, except that after the Woods metal bath had cooled to 125° C., 100 ml of water were added and the polymer/water mixture was stirred, while at a temperature of 125° C., for 1 hour and 35 minutes.

In Example 3, the water-absorbing property of the elastomer was further tested. Small pieces of elastomer were soaked in 1, 2, 3 and 5% aqueous solutions of sodium chloride for 24-hours. The elastomer samples that were soaked in salt water absorbed between 200 and 220% of the elastomer dry weight. The weight of water absorbed when soaked for the same period of time in pure water was 290%.

Several additional polymerizations were performed in the same way, except that when the polymerizations were nearly complete (i.e., the torque on the stirrer was near at its maximum and polymerization was within a half-hour of completion), nitrogen gas was introduced into the kettle to return the pressure to atmospheric. By adding two drops of different dyes (e.g., "Reactint") at that time, re-establishing the vacuum in the kettle and then completing the polymerization, and then molding articles of the kind illustrated in FIG. 1, elastomer samples of a variety of colors (e.g., pink. blue, yellow, purple) were produced. A further fluorescent yellow color ("Akazol") was added by dipping the tail of the molded object into a solution of the dye in methanol. These dyed molded elastomer samples were swollen by being immersed in water for over 24 hours and then used by expert fishermen as fishing worm lures in a comparison test against other commercial plastic "worm" lures. In this test, no fish were caught with the known commercial lures. In contrast, fishing in the same waters at the same time with water-swollen fishing lures of the invention resulted in two bass being caught and one large pickerel biting at the lure and cutting the fishing line with its sharp teeth.

Further details of the elastomers are given in Table I.

TABLE I

| | Elastomers with 2G/T hard segments | | | | |
|---|---|---|---|---|---|
| Example No. | 1 | 2 | 3 | 4 | 5 |
| Ingredients, grams[1] | | | | | |
| PO2G | 40.0 | 40.0 | 40.0 | 23.7 | 21.2 |
| PO4G | 5.0 | 5.0 | 5.0 | 10.4 | 9.3 |
| 2G | 10.0 | 10.0 | 8.0 | 10.0 | 10.0 |
| TPA | 14.2 | 14.2 | 13.8 | — | 11.0 |
| DMT | — | — | — | 7.0 | — |
| DMI | 0.2 | 0.2 | 0.2 | — | — |
| DMN | 0.2 | 0.2 | 0.0 | 0.0 | 0.0 |
| TMTM | 0.08 | 0.08 | 0.08 | 0.0 | 0.0 |
| AO-330 | 0.2 | 0.2 | 0.15 | 0.15 | 0.15 |
| Other | — | — | — | — | (2) |
| Characteristics | | | | | |
| Molecular weight | 1,568 | 1,568 | 1,568 | 2,817 | 1,618 |
| % HS | 15.0 | 15.0 | 14.4 | 11.6 | 17.2 |
| HS/SS | 1.48 | 1.48 | 1.42 | 2.0 | 2.0 |

TABLE I-continued

| | Elastomers with 2G/T hard segments | | | | |
|---|---|---|---|---|---|
| Example No. | 1 | 2 | 3 | 4 | 5 |
| % water imbibed | 168 | 201 | 291 | 237 | 129 |

Notes

[1]— means none of this ingredient added.

[2]For Example 5, 2.0 grams of a mixture of 76% dimethylglutarate and 24% dimethyladipate was added to the ingredients.

EXAMPLES 6–8

In these examples, elastomers with 4G/T hard segments were made by the general method described above. The ingredients used for the preparations and the characteristics of the resultant elastomers of the invention are summarized in Table II.

TABLE II

| | Elastomers with 4G/T hard segments | | |
|---|---|---|---|
| Example Number | 6 | 7 | 8 |
| Ingredients, grams | | | |
| PO2G | 22.7 | 22.7 | 27.3 |
| PO4G | 10.0 | 10.6 | 3.1 |
| 4G | 8.0 | 8.0 | 10.0 |
| DMT | 8.2 | 7.5 | 10.5 |
| DMI | 0.5 | — | — |
| DMN | — | 4.0 | 2.5 |
| TMTM | 0.08 | 0.08 | 0.08 |
| AO-330 | 0.15 | 0.15 | 0.15 |
| Characteristics | | | |
| Molecular weight | 1,618 | 1,610 | 1,053 |
| % HS | 12.2 | 11.0 | 16.7 |
| HS/SS | 1.10 | 1.07 | 1.04 |
| % water imbibed | 137 | 126 | 100 |

In Examples 7 and 8, films were cast from solutions of the elastomers in acetone and water. The films were then cut into strips. Tensile strengths (in grams/denier converted to deciNewtons/tex) and break elongations (in %) of the samples were measured dry and wet (after soaking in water 24 hours). The measurements were as follows:

| | | Ex. 7 | Ex. 8 |
|---|---|---|---|
| Tenacity, dN/tex, | Wet | 0.014 | 0.008 |
| | Dry | 0.021 | 0.015 |
| Break Elongation, | Wet | 132% | 49% |
| | Dry | 342% | 77% |

Although the elastomers became weaker in the fully water-soaked condition, the elastomers of the invention were nonetheless admirably suited for molded fishing lures. The softer and aqueous-filled nature of such lures of elastomer of the invention apparently were more palatable to fish than similar conventional plastic lures which contain organic plasticizers. The lures of elastomers of the invention could be firmly affixed to fish hooks with no difficulty.

EXAMPLES 9–10

Elastomers of the invention, having hard segments of 4G/N (Example 9) and 3G/BB (Example 10), were prepared by the general procedure described in the preceding examples, but with the ingredients listed in Table III. Table III also lists some of the characteristics of the resultant elastomers.

TABLE III

| | Elastomers with 4G/N and 3G/BB hard segments | |
|---|---|---|
| Example Number | 9 | 10 |
| Hard segment | 4G/N | 3G/BB |
| Ingredients, grams | | |
| PO2G | 22.2 | 16.7 |
| PO4G | 9.7 | 7.3 |
| 4G | 8.0 | — |
| DMN | 9.1 | — |
| 3G | — | 8.0 |
| DMBB | — | 7.0 |
| TMTM | — | 0.06 |
| AO-330 | 0.15 | 0.15 |
| Characteristics | | |
| Molecular weight | 1,618 | 1,618 |
| % HS | 12.0 | 8.1 |
| HS/SS | 0.9 | 0.5 |
| % water imbibed | 151 | 124 |

I claim:

1. A thermoplastic, segmented copolyetherester elastomer which consists essentially of a multiplicity of recurring intralinear long-chain and short-chain ester units connected head-to-tail through ester linkages, wherein the long-chain ester units amount to 80 to 92 weight percent of the elastomer and are represented by the structure

and the short-chain ester units amount to 20 to 8 weight percent and are represented by the structure

and wherein

R represents a divalent radical which remains after removal of two carboxyl groups from a dicarboxylic acid selected from the group consisting of terephthalic acid, 4,4'-bibenzoic acid, 2,6-naphthalenedicarboxylic acid and mixtures thereof, G is a divalent radical which remains after removal of two hydroxyl groups from a long chain poly(alkylene oxide) glycol having a number average molecular weight in the range of 1,000 to 3,500 and consisting essentially of 60 to 95 weight percent of poly(ethylene oxide) glycol copolymerized or mixed with 40 to 5 percent of a second poly(alkylene oxide) glycol, and D is a divalent radical which remains after removal of terminal hydroxyl groups from a short chain diol selected from the the group consisting of ethylene glycol, 1,3-propane glycol, 1,4-butane diol and mixtures thereof.

2. An elastomer of claim 1 wherein the poly(ethylene oxide) glycol amounts to at least 70 weight percent of the poly(alkylene oxide) glycol and the second poly(alkylene oxide) glycol is poly(tetramethylen oxide) glycol.

3. An elastomer of claim 1 wherein the long chain ester units amount to 85 to 90 weight percent of the elastomer, the short chain ester units amount to 15 to 10 weight percent, and the number average molecular weight of the poly(alkylene oxide) glycol is in the range of 1,400 to 2,000.

4. An elastomer of claim 1, 2 or 3 wherein the short chain ester unit is derived from ethylene glycol and terephthalic acid and the molar ratio of hard segment to soft segment in the elastomer is in the range of 1 to 3.

5. An elastomer of claim 4, wherein the molar ratio is in the range of 1.3 to 2.2.

6. An elastomer of claim 1, 2 or 3 wherein the short chain ester unit is derived from 1,4-butane diol and terephthalic acid and the molar ratio of hard segment to soft segment in the elastomer is in the range of 0.3 to 1.3.

7. An elastomer of claim 6, wherein the molar ratio is in the range of 0.8 to 1.2.

8. An elastomer of claim 1, 2 or 3 wherein the short chain ester unit is derived from 1,4-butane diol and 2,6-naphthalene dicarboxylic acid and the molar ratio of hard segments to soft segments is the range of 0.3 to 1.3.

9. An elastomer of claim 8, wherein the molar ratio is in the range of 0.8 to 1.2.

10. An elastomer of claim 1 or 2 or 3 wherein the short chain ester unit is derived from 1,3-propane diol and 4,4'-bibenzoic acid and the ratio of hard segments to soft segments is the range of 0.3 to 1.3.

11. An elastomer of claim 10, wherein the molar ratio is in the range of 0.3 to 0.7.

12. An elastomer of claim 1, 2 or 3 in the form of a shaped article.

13. An elastomer of claim 12 which imbibes water amounting to at least 100% of its dry weight as a result of immersion in water for 24 hours.

14. A shaped article of claim 12 containing water amounting to at least 100% of its dry weight in the shape of an artificial worm-like fishing lure.

* * * * *